US008035682B2

(12) United States Patent
Trowbridge

(10) Patent No.: US 8,035,682 B2
(45) Date of Patent: Oct. 11, 2011

(54) MOVING SCREEN IMAGE ASSEMBLER

(75) Inventor: Scott R. Trowbridge, Windmere, FL (US)

(73) Assignee: Universal City Studios LLC, Universal City, CA (US)

( * ) Notice: Subject to any disclaimer, the term of this patent is extended or adjusted under 35 U.S.C. 154(b) by 1326 days.

(21) Appl. No.: 11/614,712

(22) Filed: Dec. 21, 2006

(65) Prior Publication Data

US 2008/0150954 A1   Jun. 26, 2008

(51) Int. Cl.
*G06T 3/40* (2006.01)
(52) U.S. Cl. ............ 348/46; 348/744; 345/581; 382/254
(58) Field of Classification Search .................... 348/46, 348/744–747, 581; 345/581; 382/254, 256, 382/298
See application file for complete search history.

(56) References Cited

U.S. PATENT DOCUMENTS

| 4,684,996 | A | | 8/1987 | Baumeister |
| 5,715,021 | A | * | 2/1998 | Gibeau et al. ................. 348/750 |
| 5,860,721 | A | * | 1/1999 | Bowron et al. ................ 353/101 |
| 6,064,399 | A | * | 5/2000 | Teo ................................ 345/629 |
| 6,594,404 | B1 | | 7/2003 | Smith |
| 7,813,578 | B2 | * | 10/2010 | Park et al. .................... 382/254 |
| 2003/0210230 | A1 | * | 11/2003 | Waters ........................... 345/158 |
| 2004/0257540 | A1 | | 12/2004 | Roy et al. |
| 2005/0219425 | A1 | | 10/2005 | Maxson et al. |

FOREIGN PATENT DOCUMENTS

| CA | 2 464 569 A1 | 10/2004 |
| EP | 1 715 291 A | 10/2006 |
| JP | 2006 323139 A | 11/2006 |
| WO | WO 2006/110141 A | 10/2006 |

* cited by examiner

*Primary Examiner* — Moustafa M Meky
(74) *Attorney, Agent, or Firm* — Fletcher Yoder

(57) ABSTRACT

A device for modifying source image frames to create modified image frames and for projecting the modified image frames onto a geometrically changing viewable surface is presented. The device may include a viewable surface image sampler for outputting surface image frames each including surface image pixels that reflect the geometrically changing viewable surface and a comparator in circuit with the surface image sampler. The comparator may be configured for identifying a number and a location of the surface image pixels of one or more of the surface image frames and for identifying a number and a location of source image pixels in one or more of the source image frames. The comparator may be further configured to thereafter compare the number and the location of the surface image pixels with the number and the location of the source image pixels to determine a number and a location of target pixels. An image modification device may be interconnected with the comparator and configured to receive the target pixels and to reconfigure the one or more source image frames to one or more modified image frames that are reconfigured to fit the target pixels and thereby fit the geometrically changing viewable surface. At least one projector may be configured to project the one or more modified image frames onto the geometrically changing viewable surface.

18 Claims, 3 Drawing Sheets

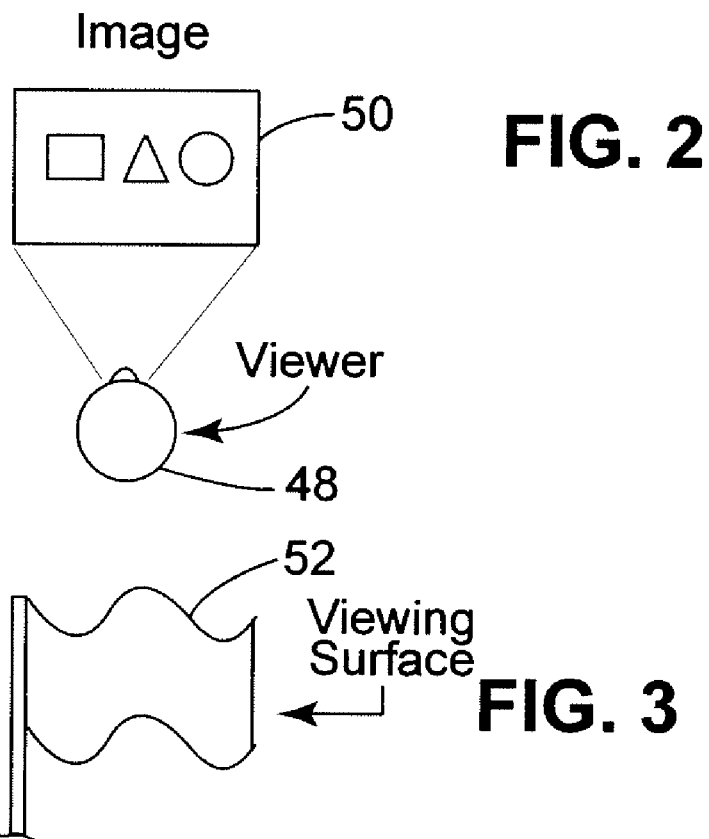
Image
FIG. 2
FIG. 3
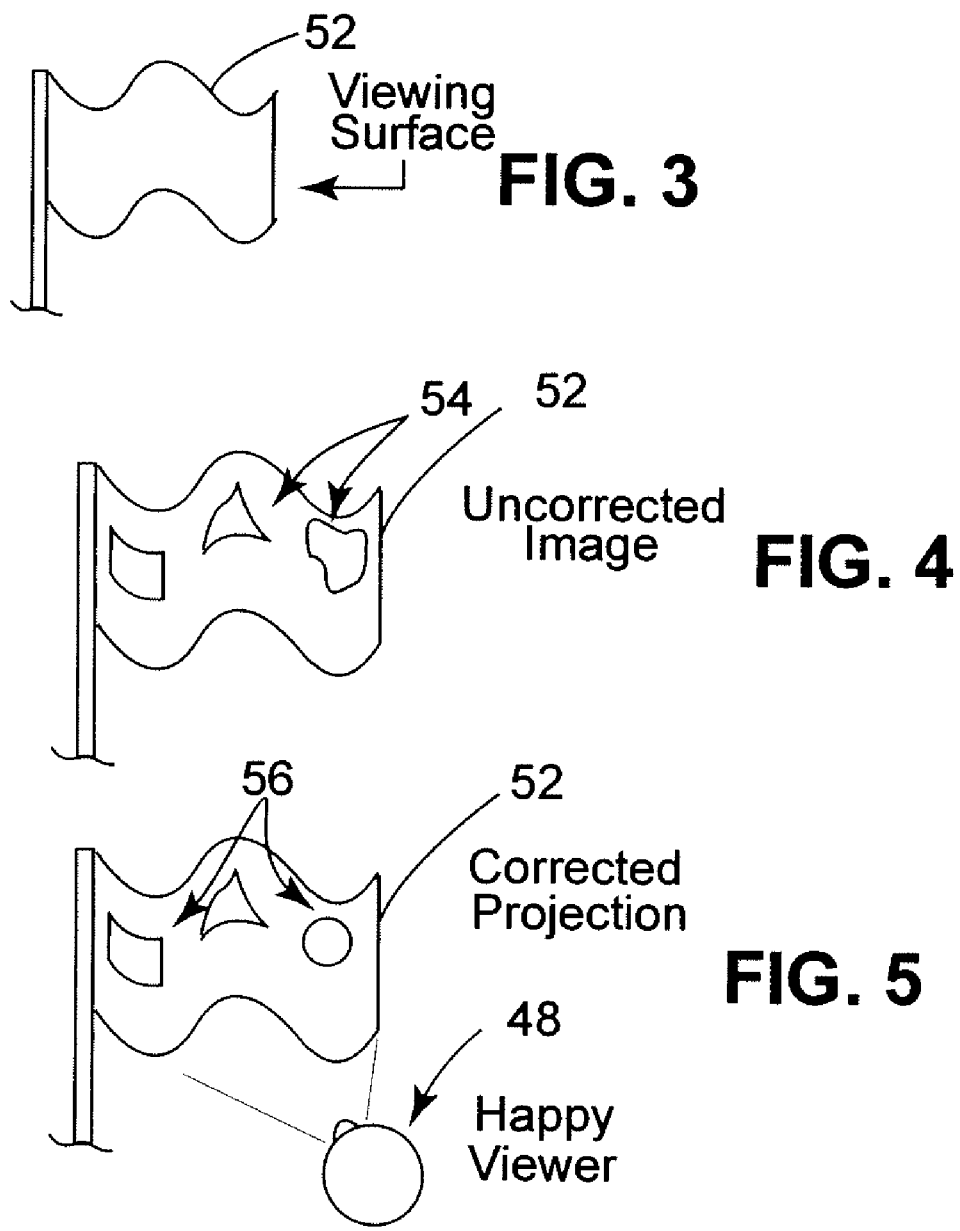
Uncorrected Image
FIG. 4
Corrected Projection
FIG. 5
Happy Viewer

MOVING SCREEN IMAGE ASSEMBLER

BACKGROUND OF THE INVENTION

1. Field of the Invention

The subject matter described herein relates generally to image processing and, more particularly, to devices and methods for varying a geometry of an image.

2. Related Art

U.S. Pat. No. 6,594,404 to Smith describes a technique for resizing a digital video image, extending over a given number of source pixels, to meet a different number of target pixels. This technique requires expressing point brightness energy associated with each source pixel as an area that spans two source pixel intervals, each area span having a shape proportional to the energy distribution of the source pixel with time. Creating for each target pixel a sample aperture of a duration which is a function of the resizing factor, sampling the area spans with each sample aperture to provide, for each target pixel, a set of coefficients, where each coefficient represents the proportion of an area span which is within the sample aperture. Thereafter, scaling, with its associated coefficient, the amount of point brightness energy for each source pixel whose area span appears within any given sample aperture.

While the above described technique is employable for resizing a source image when a given number of source pixels and a given number of target pixels are provided, no suitable device or method of identifying various source pixels and various target pixels is available as is desired when it is necessary to project a source image onto a geometrically changing surface.

BRIEF DESCRIPTION OF THE INVENTION

In accordance with an embodiment of the present invention, a device for modifying source image frames to create modified image frames and for projecting the modified image frames onto a geometrically changing viewable surface is presented. The device may comprise a viewable surface image sampler for outputting surface image frames each comprising surface image pixels that reflect the geometrically changing viewable surface and a comparator in circuit with the surface image sampler. The comparator may be configured for identifying a number and a location of the surface image pixels of one or more of the surface image frames and for identifying a number and a location of source image pixels in one or more of the source image frames. The comparator may be further configured to thereafter compare the number and the location of the surface image pixels with the number and the location of the source image pixels to determine a number and a location of target pixels. An image modification device may be interconnected with the comparator and configured to receive the target pixels and to reconfigure the one or more source image frames to one or more modified image frames that are reconfigured to fit the target pixels and thereby fit the geometrically changing viewable surface. At least one projector may be configured to project the one or more modified image frames onto the geometrically changing viewable surface.

In another embodiment of the present invention, a method for modifying source image frames to create modified image frames and for projecting the modified image frames onto a geometrically changing viewable surface comprises generating surface image frames each comprising surface image pixels that reflect the geometrically changing viewable surface; identifying a number and a location of surface image pixels of one or more of the surface image frames; identifying a number and a location of source image pixels of one or more the source image frames; comparing the number and the location of surface image pixels with the number and location of source image pixels to determine a number and a location of target pixels; reconfiguring the one or more source image frames to one or more modified image frames that are sized to fit the target pixels and thereby fit the geometrically changing viewable surface; and projecting the one or more modified image frames onto the geometrically changing viewable surface.

BRIEF DESCRIPTION OF THE DRAWINGS

The following detailed description is made with reference to the accompanying drawings, in which:

FIGS. 2-5 are a series of diagrams showing an example of a source image, an exemplary geometrically changing viewable surface, an uncorrected projected image and an image corrected by the moving screen image assembler of FIG. 1 projected on the exemplary geometrically changing viewable surface.

DETAILED DESCRIPTION OF THE PREFERRED EMBODIMENT

One embodiment of the present invention concerns a device and a method for projecting a source image onto a geometrically changing viewing surface. In this embodiment, an image of the viewing surface is captured and compared with a source image to determine a number and a location of target pixels and the source image is modified and then projected onto the geometrically changing viewing surface in a corrected fashion.

Figure 1:
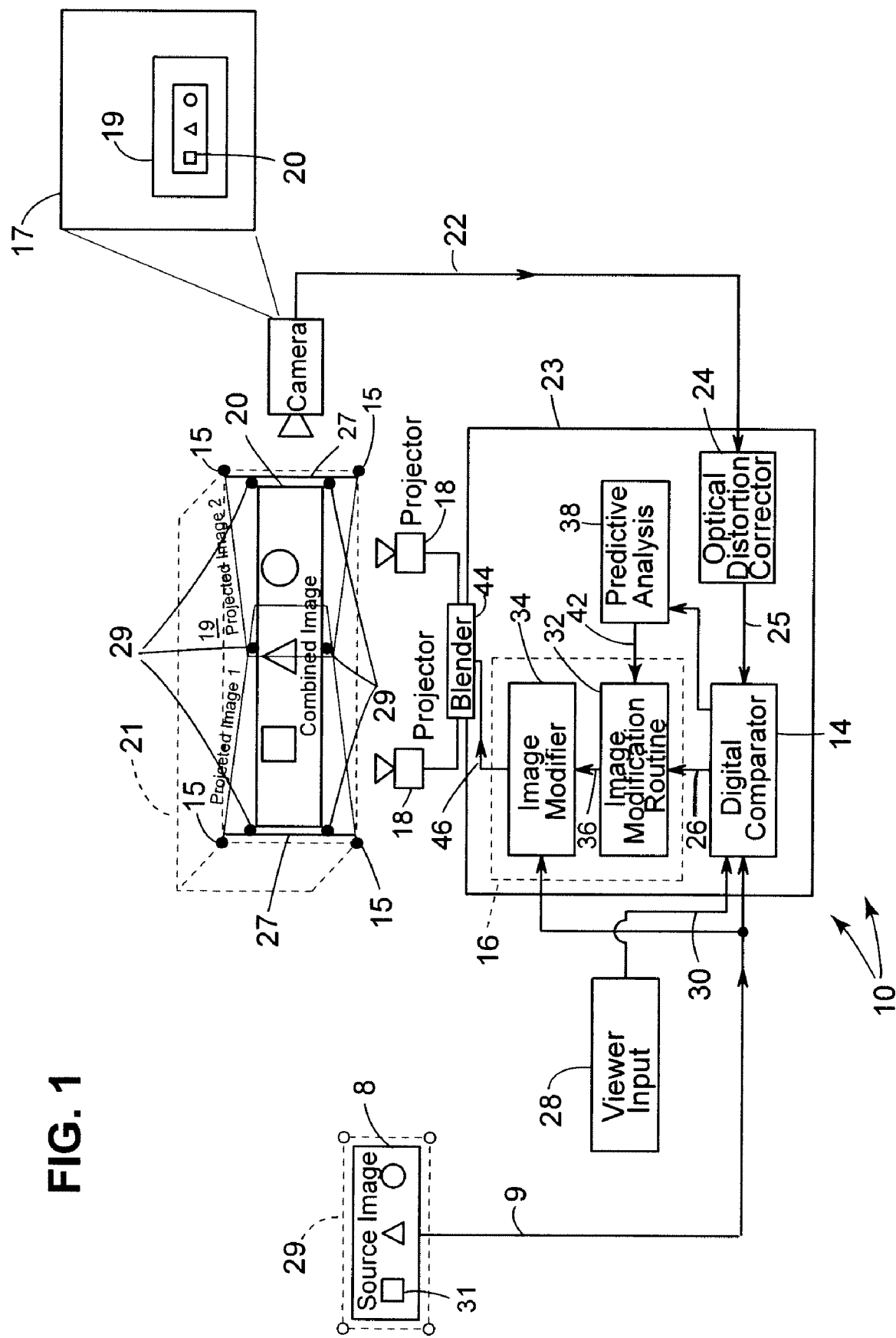
FIG. 1 is a diagram showing a moving screen image assembler in accordance with one embodiment of the present invention.

Referring now to FIG. 1, a device for modifying a source image 8 in accordance with one embodiment of the present invention is illustrated generally at 10. In this embodiment, the device 10 comprises an image sampler 12, a comparator 14, a device for image modification 16 and one or more projectors 18 that project a modified image 20.

The source image 8 may be generated by any number of electronic components including a live camera feed or recorded video such as that from a digital video disc (DVD) player or a video cassette recorder (VCR) player and may be input to the device for image modification 16 via a known wireless or wired connection 9.

The image sampler 12 comprises, in one embodiment, a known video camera that provides a frame by frame output that is at least about thirty frames per second. The output of the image sampler 12 comprises surface image frames 17, that each, in turn, comprise surface image pixels that reflect a viewable surface 19 of a movable/moving object 21. The output of the image sampler 12 may be conducted via a known wireless or wired connection 22 which may be connected in circuit with a modification device 23 that includes an optical distortion correction routine 24. The optical distortion correction routine 24 functions in a known manner to reduce distortion in the output from the image sampler 12. Output from the optical distortion correction routine 24 may be conducted to the comparator 14 via a connection 25. It will be understood that the term "connection" as used in the disclosure hereof shall be broadly construed to refer, for example, to a physical connection for hardware or to an interface for a software and/or a firmware program that provides interfacing between any of the components/routines described herein.

The comparator 14, in one embodiment a digital comparator, functions to compare on a pixel by pixel basis a surface image frame 17 with a source image frame 8 at a rate of approximately at least thirty frames per second. This is to provide an indication of the difference in number of available pixels and relative location of each pixel.

The comparator 14 may also function to identify a number and location of surface image pixels that reflect the surface image 19 out of the total number of pixels that make up the surface image frame 17. This may be accomplished by having identifiable indicators 15 such as marks or sensors on the surface image 19. The comparator 14 looks for these locations and generates a number and a location of target pixels. Optionally, in another embodiment and rather than indicators 15 a surface image recognition program, based on, e.g., available facial image recognition programs may be employed to generate a number and a location of target pixels. Once the target pixels are identified, the comparator 14 may then bound the surface image pixels using a bounding routine and thereafter determine a number and location of target pixels. The comparator 14 then outputs the number and the location of target pixels to the device for image modification 16 via a connection 26. Also, it will be appreciated that the total available area 27 that may be projected by the projectors 18 may also be considered to be a bound area by the comparator in determining the number and location of target pixels. Further, the number and location of source image pixels may be identified by using either a routine to determine those via, e.g., viewer input, described below, or fixed coordinates 29.

In an optional embodiment, viewer input 28 may be provided via a wired or wireless connection 30 to the comparator 14 from any suitable device such as a key pad (not shown). Viewer input 28, may, e.g., function to narrow the number and location of source pixels of the source image that is compared with the surface image pixels as described above. In one particular example, a viewer (not shown) may choose only a square 31 for projection onto the viewable surface 19.

The device for image modification 16 comprises, in one embodiment, an image modification routine 32 and an image modifier 34 communicating via a connection 36. The image modification routine 32 running on a processor (not shown) and functions to perform the calculations necessary to modify the image as determined by the comparator 14 and where available, predictive analysis as described below and outputs data describing the necessary modifications to the source image 8.

The image modifier 34, receives the output data from the image modification routine 32 and functions to reconfigure the source image 8 to fit within the target pixels and thereby create a modified image 20. The image modifier 34 may comprise a separate processor (also not shown), or the same processor described above, that is configured to carry out a technique that may comprise that described in U.S. Pat. No. 6,594,404 to Smith, incorporated herein to the extent necessary to make and use the present invention, for resizing an image to fit within a number of target pixels. The image modifier 34 may receive the source image 8, whether or not there is a choice of a preferred number and a location of source pixels in the source image 8 and the number and the location of target pixels to create the modified image 20.

In another optional embodiment, a predictive analysis routine shown at 38 may be used to increase an efficiency of the comparator 14. The predictive analysis routine may be carried out on a separate processor or the one described above and is provided for predicting changes in the number and location of surface image pixels from one surface image frame 17 to another. This is advantageous for predicting movement of the viewable surface 19 and thereby reducing analysis by the digital comparator 14. Output from the comparator 14 is input via a connection 40 to the predictive analysis routine, and output comprising a number and a location of surface image pixels is conducted to the image modification routine via a connection 42.

Projector 18 may comprise any suitable device for projecting an image such as that sold under the trademark CP2000 by the Christie Corporation of Cypress, Calif. Where multiple projectors 18 are provided each receive and project a modified image 20 from an optional blender 44 in circuit with the image modifier 34 via a connection 46.

It will be appreciated that in various optional embodiments of the present invention, each of the components within the modification device 23 may comprise hardware, separate or integrated software routines or firmware running on a single processor, or some combination thereof.

Turning now to FIG. 2, this figure illustrates a viewer 48 that is viewing a source image 50. FIG. 3 shows an example of a geometrically dynamic viewing surface 52, in this case, a flag waving in wind. FIG. 4 shows a simple projection of the source image 54 onto the viewing surface 52 absent operation of the device 10 and FIG. 5 shows a projection of a modified image 56 using the device 10 for a viewer 48.

Figure 6:
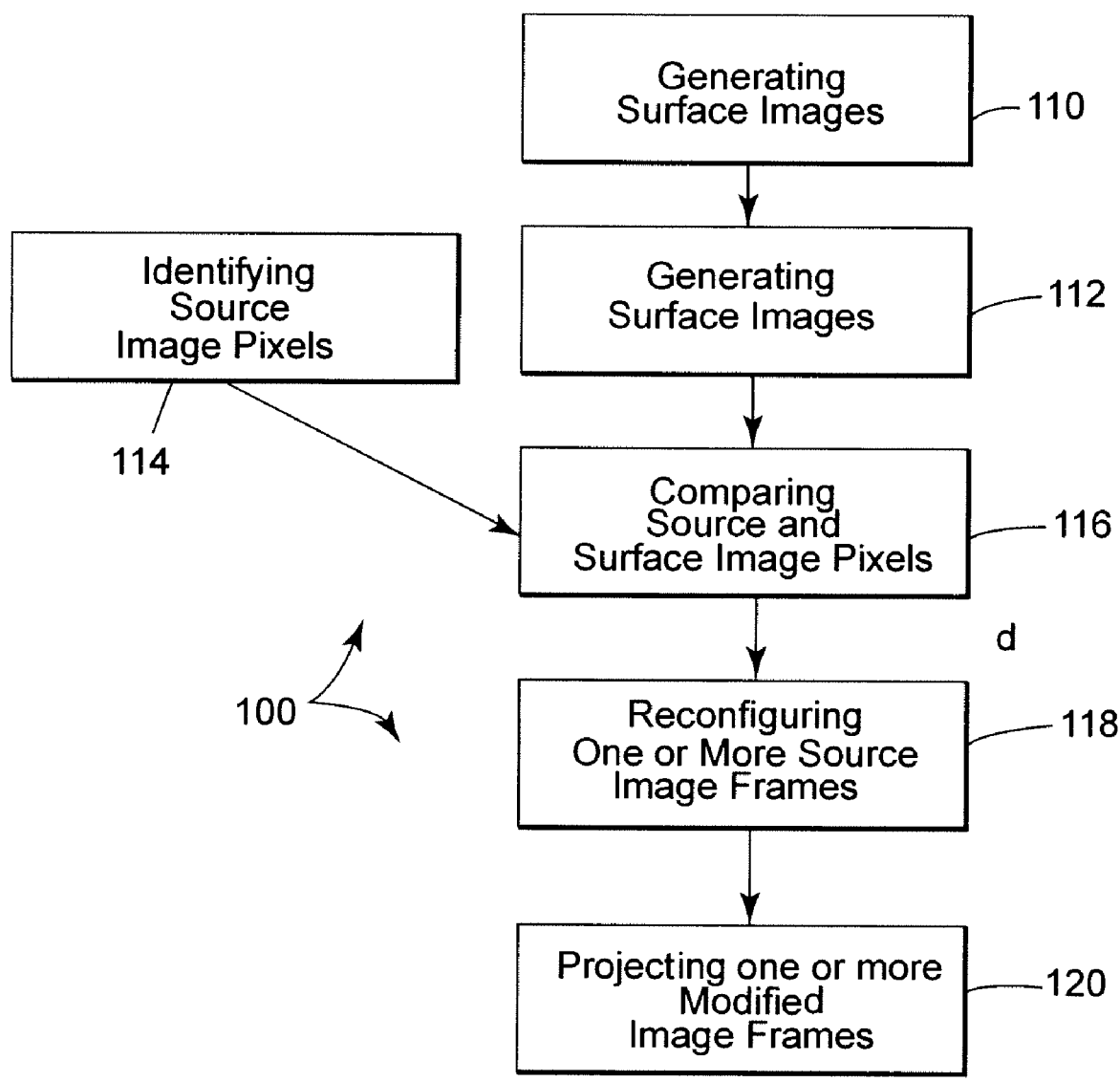
FIG. 6 is a flow diagram showing a method in accordance with another embodiment of the present invention.

Another embodiment of the present invention is shown generally at 100 in FIG. 6. In this embodiment, a method of modifying source image frames to create modified image frames and for projecting the modified image frames onto a geometrically changing viewable surface, comprises, as shown at 110, generating surface image frames that each comprise surface image pixels that reflect the geometrically changing viewable surface. Next, as shown at 112, a number and a location of surface image pixels of one or more of the surface image frames may be identified. Further, as provided at 114, a number and a location of source image pixels of one or more the source image frames is identified. Thereafter, as illustrated at 116, the number and the location of surface image pixels may be compared with the number and location of the source image pixels to determine a number and a location of modified target pixels. Next, configuring of the one or more source image frames, shown at 118, as one or more modified image frames is carried out to fit the target pixels and thereby fit the geometrically changing viewable surface. Thereafter, as provided at 120, the one or more modified image frames may be projected onto the geometrically changing viewable surface.

Technical effects of the herein described systems and methods include determining a number and a location of target pixels so that a source image may be reconfigured as a modified image that fits within this number and location of target pixels. Other technical effects include projecting the modified image and receiving viewer input.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A device for modifying source image frames to create modified image frames and for projecting the modified image frames onto a geometrically changing viewable surface, comprising:

a viewable surface image sampler for outputting surface image frames each comprising surface image pixels that reflect the geometrically changing viewable surface;

a comparator in circuit with the surface image sampler and configured for identifying a number and a location of the surface image pixels of one or more of the surface image frames and for identifying a number and a location of source image pixels in one or more of the source image frames and thereafter comparing the number and the location of the surface image pixels with the number and the location of the source image pixels to determine a number and a location of target pixels and;

an image modification device interconnected with the comparator and configured to receive the target pixels and to reconfigure the one or more source image frames to one or more modified image frames that are reconfigured to fit the target pixels and thereby fit the geometrically changing viewable surface; and at least one projector configured to project the one or more modified image frames onto the geometrically changing viewable surface.

2. The device of claim 1, wherein the image modification device comprises:

at least one processor configured for running an image modification routine which provides the calculations necessary to modify the image as determined by the comparator and output data; and an image modifier configured to receive the data output from the processor and to create the modified image.

3. The device of claim 2, wherein the digital comparator identifies a number and a location of surface image pixels for each of multiple surface image frames and wherein the at least one processor is further configured for performing predictive analysis by reviewing a number and a location of each surface image pixel for one particular surface image frame and predicts a number and a location of surface image pixels for future surface image frames.

4. The device of claim 1, wherein the comparator is a digital comparator and wherein the digital comparator is configured to identify the target pixels from the one or more surface image frames that reflect the geometrically changing viewable surface.

5. The device of claim 4, wherein comparator utilizes indicators identified on the surface image frames to identify target pixels.

6. The device of claim 4, wherein the comparator uses a routine for surface image recognition to identify target pixels.

7. The device of claim 4, wherein the digital comparator is configured to receive input from one or more viewers as to at least one of a number and a location of source image pixels in a particular source image frame.

8. The device of claim 4, wherein the digital comparator is further configured to consider the total area projectable by the at least one projector in determining the number and location of target pixels.

9. The device of claim 1, further comprising an optical distortion correction routine.

10. The device of claim 1, wherein the at least one projector comprises a plurality of projectors.

11. The device of claim 10, further comprising a blender interposed between the image modification device and the plurality of projectors.

12. A method for modifying source image frames to create modified image frames and for projecting the modified image frames onto a geometrically changing viewable surface, comprising:

generating surface image frames each comprising surface image pixels that reflect the geometrically changing viewable surface;

identifying a number and a location of surface image pixels of one or more of the surface image frames;

identifying a number and a location of source image pixels of one or more the source image frames;

comparing the number and the location of surface image pixels with the number and location of source image pixels to determine a number and a location of target pixels;

reconfiguring the one or more source image frames to one or more modified image frames that are sized to fit the target pixels and thereby fit the geometrically changing viewable surface; and projecting the one or more modified image frames onto the geometrically changing viewable surface.

13. The method of claim 12, wherein the step of comparing comprises using indicators to bound an area of the surface image pixels for identifying the target pixels.

14. The method of claim 12, wherein the step of comparing comprises a surface image recognition routine for identifying the target pixels.

15. The method of claim 12, further comprising receiving input from one or more viewers as to at least one of a number and a location of source image pixels in a particular source image frame.

16. The method of claim 12, further comprising identifying a number and a location of surface image pixels for each of multiple surface image frames and performing predictive analysis by reviewing a number and a location of each surface image pixel for one particular surface image frame and predicting a number and a location of surface image pixels for future surface image frames.

17. The method of claim 12, further comprising correcting optical distortion in the surface image frames.

18. The device of claim 12, wherein projecting the modified image comprises blending modified images.

* * * * *